United States Patent
Kaewell, Jr.

Patent Number: 5,432,822
Date of Patent: Jul. 11, 1995

[54] ERROR CORRECTING DECODER AND DECODING METHOD EMPLOYING RELIABILITY BASED ERASURE DECISION-MAKING IN CELLULAR COMMUNICATION SYSTEM

[75] Inventor: John D. Kaewell, Jr., Bensalem, Pa.

[73] Assignee: Hughes Aircraft Company, Los Angeles, Calif.

[21] Appl. No.: 45,344

[22] Filed: Mar. 12, 1993

[51] Int. Cl.⁶ .............. H03D 1/00; H04L 27/06
[52] U.S. Cl. .............. 375/340; 375/331; 371/37.1
[58] Field of Search .............. 375/94, 53, 57, 83, 375/85, 98; 371/37.1, 37.5, 37.9, 38.1, 39.1, 43, 44, 45; 455/238.1

[56] References Cited

U.S. PATENT DOCUMENTS

| | | | |
|---|---|---|---|
| 4,945,549 | 7/1990 | Simon et al. | 375/57 |
| 5,245,611 | 9/1993 | Ling et al. | 375/15 |
| 5,249,205 | 9/1993 | Chennakeshu et al. | 375/101 |

Primary Examiner—Stephen Chin
Assistant Examiner—Don Vo
Attorney, Agent, or Firm—Gordon R. Lindeen, III; Wanda K. Denson-Low

[57] ABSTRACT

A receiver (30) in a digital communication system determines the phase error magnitude (60) and the magnitude error (54) for each received channel symbol and selects Reed-Solomon symbol erasures from the magnitude error and phase error magnitude values as a function of mobile unit speed (52) which is determined from demodulator data. The selected symbol erasures are implemented (78) in a Reed-Solomon decoder resulting in improved decoding performance.

18 Claims, 4 Drawing Sheets

ERROR CORRECTING DECODER AND DECODING METHOD EMPLOYING RELIABILITY BASED ERASURE DECISION-MAKING IN CELLULAR COMMUNICATION SYSTEM

BACKGROUND OF THE INVENTION

The present invention relates to cellular communication systems and more particularly to digital cellular receivers in which error correcting decoders are employed.

In cellular communication systems, encoding/decoding procedures are applied to transmitted voice and other data to reduce data errors. Prior to transmission from a mobile phone or from a base station, encoding is usually performed with either a block coding scheme or a trellis coding scheme.

In the prior art, the most common cellular system procedure for encoding messages at the transmit end of the system is a two step procedure in which a message is first encoded using a cyclic redundancy code (CRC) in an outer code loop and then encoded using a trellis or block code in an inner code loop. At the receiving end of the cellular system, the message is decoded using the inner loop code to eliminate as many errors as possible through forward error correction (FEC).

The message is then decoded using the outer loop CRC code to detect whether any message errors still exist. The message is discarded if any error is detected.

The most common block coding scheme is the Reed-Solomon scheme which is best adapted for correcting burst data errors such as those that often occur in cellular communication channels as a result of Rayleigh fading. Trellis encoding is most commonly implemented by means of a convolutional scheme, and is best adapted for correcting random data errors. Each of these schemes has been variously embodied to limit data transmission errors in cellular communication systems.

To provide for error correction and detection in the Reed-Solomon scheme, data in a word to be transmitted is first encoded in an outer loop commonly by a CRC encoder which generates CRC error detection bits. Parity bits are also generated to provide FEC in accordance with the Reed-Solomon procedure. The CRC and FEC bits are combined with the data bits in the word to be transmitted, such as from a mobile unit.

The received word is checked to determine whether the data bits received are the same as the data bits transmitted. For this purpose, the received word data is first passed through a Reed-Solomon decoder where FEC is applied. The Reed-Solomon output is then passed through a CRC encoder.

The resulting CRC code bits and the received CRC code bits are compared. If the compared CRC bits are the same, the data is accepted as valid. If a difference is detected, the received data is discarded as erroneous. Generally, a CRC encoder having a longer CRC code provides better error protection by making it less likely that a data error will go undetected.

Generally, a Reed-Solomon (R-S) decoder can correct as many symbol erasures as there are parity symbols in an encoded R-S code word. A symbol erasure is an R-S symbol that can be identified as probably being corrupted. If erasure information is not available, the R-S decoder can still be used to locate error symbols, and then correct the located error symbol. However, when the R-S decoder is used to locate and correct symbol errors, only half as many error symbols can be corrected as there are parity symbols. Therefore, a Bit Error Rate (BER) performance gain can be realized when R-S symbol erasures can be identified without using the R-S decoder to locate them.

Prior art decoding schemes for R-S and other block codes have generally made use of soft decision (reliability) information to improve R-S coder/decoder performance, but improvements have been limited by the type of soft decision information employed and the manner of its use in identifying symbol error locations. Prior art decoding schemes for trellis or convolutional codes have similarly been limited in the extent to which coder/decoder performance has been improved through the use of soft decision information.

SUMMARY OF THE INVENTION

The present invention is directed to a digital cellular communication system and method in which decoding is performed with the use of reliability information including mobile unit speed to provide better cellular system performance. A receiver is provided in a mobile unit and/or a base station in a digital cellular communication system and comprises means for receiving transmitted signals encoded with a preselected trellis or block code and means for demodulating the received signals to generate digital word signals for decoding. Means are provided for computing phase error magnitude for each channel symbol in each digital word signal and for computing magnitude error for each channel symbol in each digital word signal. Means are provided for estimating mobile unit speed from demodulator data. Means are employed for decoding the digital word signals in accordance with the phase error magnitude and the magnitude error as a function of the mobile unit speed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate a preferred embodiment of the invention and together with the description provide an explanation of the objects, advantages and principles of the invention. In the drawings.

DESCRIPTION OF THE INVENTION

Figure 1:
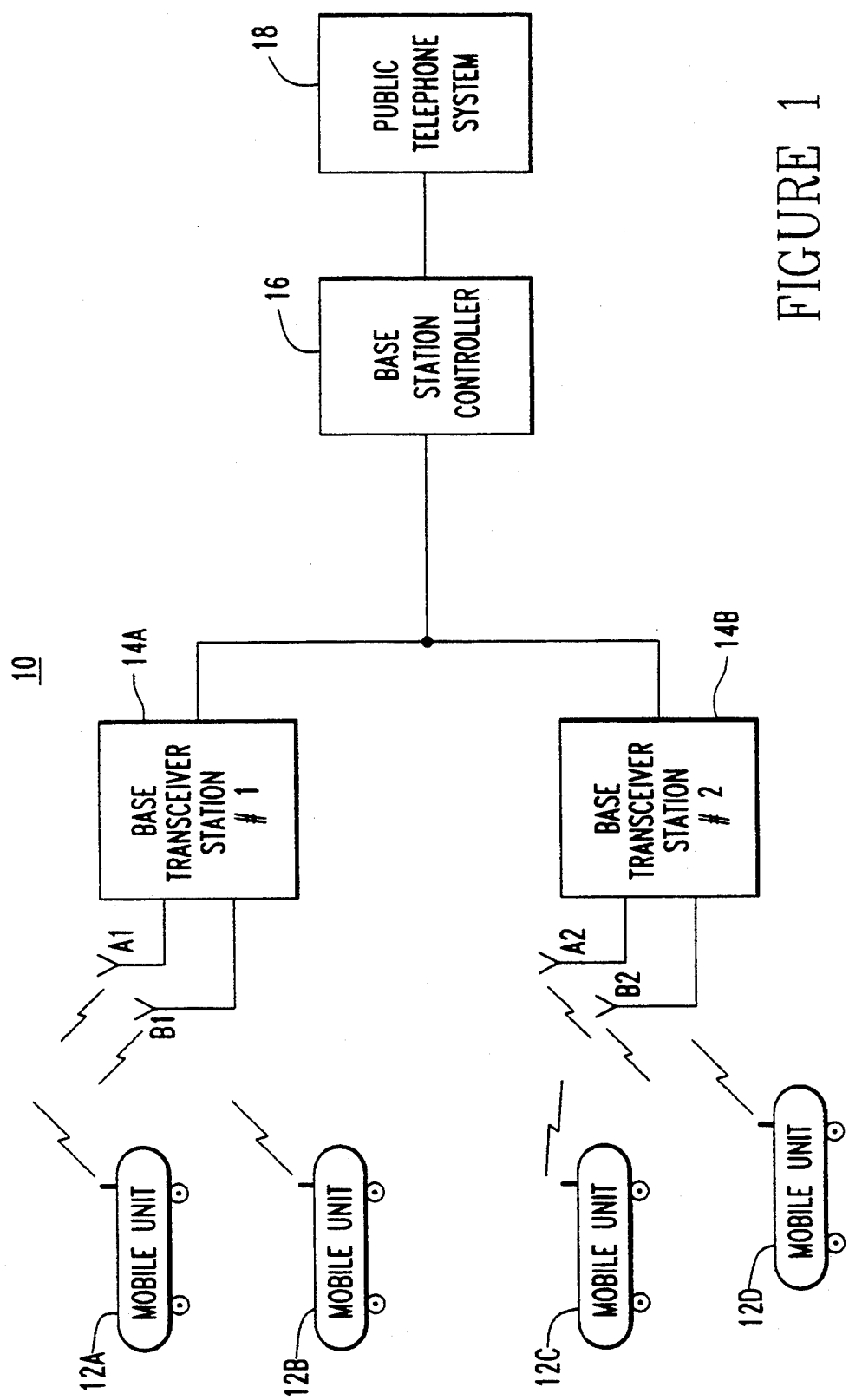
FIG. 1 is a block diagram for a digital communication system in which the present invention is embodied in its preferred form.

A digital cellular communication system 10 is shown in FIG. 1 in which a preferred form of the present invention is embodied. The system 10 is operative in a defined geographic region such as all or part of a metropolitan area.

The cellular system 10 includes numerous mobile phone units, as represented by four illustrated units 12A through 12D. Communication links may be established between the mobile units 12A–12D and a base station for the communication cell within which the mobile unit(s) may be located. In this illustrative case two base stations 14A and 14B are shown.

Respective pairs of diversity antennae A1, B1 and A2, B2 are provided at the base stations to provide for receiving diversity signals from a transmitting mobile unit. In the preferred embodiment, the diversity signals are processed to remove errors and develop high quality demodulated voice signals in accordance with the invention.

A base station controller 16 provides system management functions through regulation of the operation of the base stations 14A and 14B and by establishing communication links with a public telephone system 18.

CELLULAR RECEIVER EMPLOYING PREFERRED R-S DECODER WITH SYMBOL ERASURE DECISION SUBSYSTEM

In accordance with the invention, certain soft decision information is most usefully employed when decoding codewords which have been encoded in one of the two most common ways, trellis coding and block coding. The present invention improves coding/decoding performance (reducing the number of errors in w) for various codes including R-S or other block codes or convolutional or other trellis codes by making use of certain "soft decision" information from a demodulator. Specifically, the decoder uses a vehicle speed estimate, and magnitude error and phase error estimates from the demodulator to assign erasures, in the case of R-S coding, or to improve branch metrics decoding in trellis coding.

Generally, with reference to the preferred R-S coding application of the invention, R-S decoders have the property that if $X$ errors in unknown locations can be corrected, then $2X$ errors in known symbol locations (erasures) can be corrected. If erasure locations can be determined reliably, then an R-S decoder can correct more errors.

In trellis decoders, the soft decision information is used to improve the conventional branch metric decoding process by 4 to 5 dB. In R-S or other block decoders, the soft decision information is used to provide even greater improvement in the R-S or other block decoding process. In R-S decoders, erasure locations are assigned with higher reliability.

Figure 2:
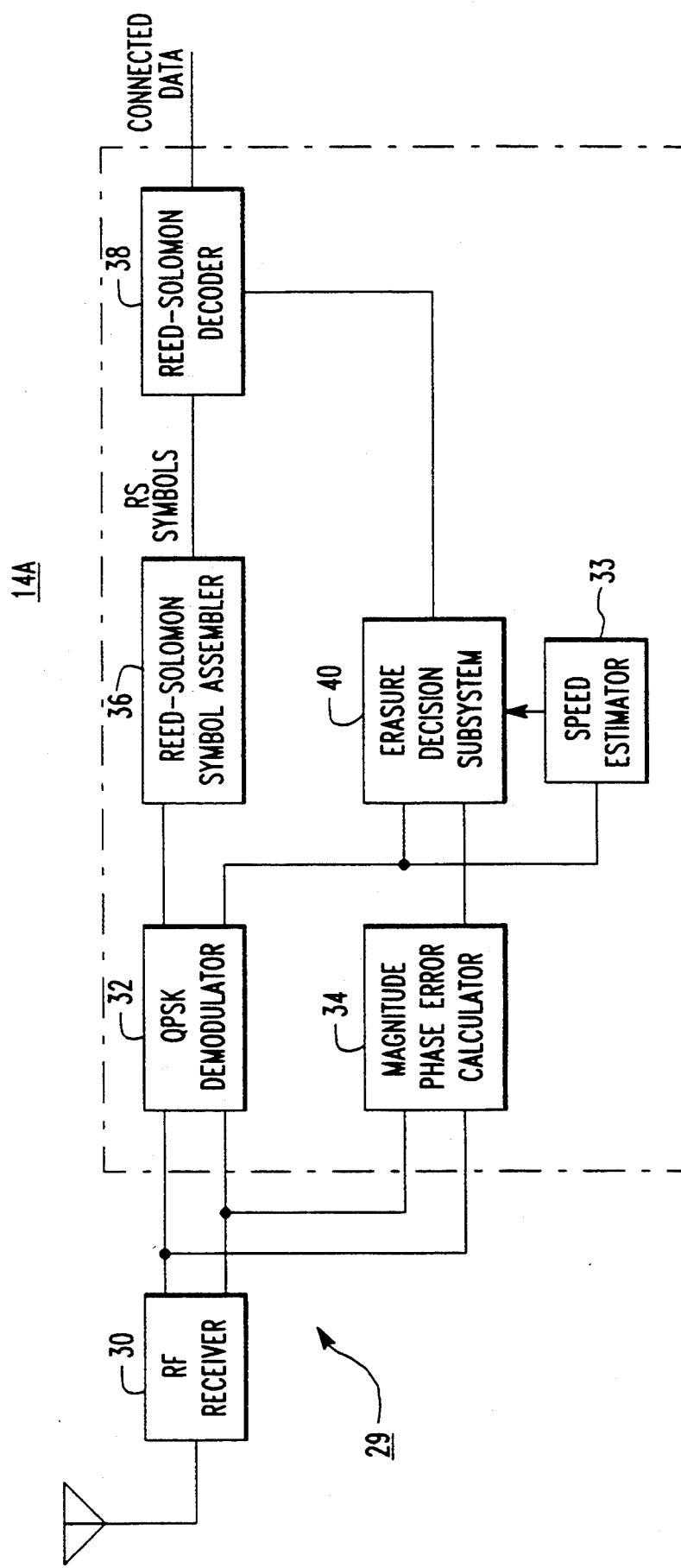
FIG. 2 shows a more detailed block diagram for receiver circuitry employing an erasure decision subsystem in a base station and/or mobile phone units in the communication system of FIG. 1.

Receiver circuitry 29 for the base station 14A or 14B is shown in greater detail in FIG. 2. Signal inputs are received over a fading channel. A digitized output (I and Q samples) from an RF receiver 30 is applied to a demodulator 32 that is structured, in this case, to operate in accordance with the QPSK type of modulation. Other forms of digital modulation may be employed in other applications of the invention. The receiver 30 is also coupled to a calculator 34 where magnitude error and phase error magnitude are computed from Q and I output signals from the receiver 30.

Figure 5:
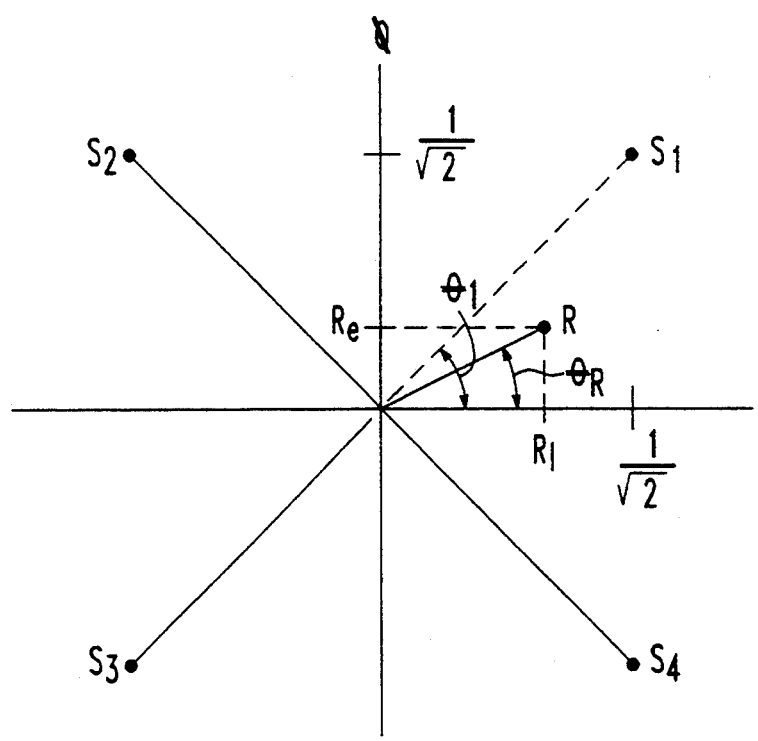
FIG. 5 is a graph that illustrates QPSK signal space.

In the demodulator 32, a decision as to which channel symbol was transmitted is made by finding which symbol ($S_1, S_2, S_3, S_4$) is closest to the received signal. In the QPSK example of FIG. 5, a received signal, R, is closer to $S_1$ than to $S_2, S_3$, or $S_4$. The demodulator 32 accordingly decides that $S_1$ is the channel symbol that was transmitted.

Magnitude and phase error magnitude parameters are calculated to provide soft decision or reliability information about demodulator channel symbol decisions. These parameters are calculated as follows (see FIG. 5):

A) Magnitude error is calculated as the absolute value of the difference between the magnitude of the selected symbol ($S_1, S_2, S_3, S_4$) and the received signal. Since the magnitude of the signal space representation for each symbol is 1, the following equation applies:

$$ME_R = \text{Magnitude error} = |1 - \sqrt{R_I^2 + R_Q^2}\,|$$

B) Phase Error Magnitude is the magnitude of the difference of angles $\Theta_i$ and $\Theta_R$ where $\Theta_i$ is the angle of the selected symbols signal space representation and $\Theta_R$ is the received signal angle, $$PEM_R = \text{Phase Error} = |\Theta - \Theta_R|,$$

which, in the illustrated example, is:

$$PEM_R = |\Theta_1 - \Theta_R|.$$

In the mobile environment, the received signals are subject to Rayleigh fading characteristics relative to the Doppler frequency shift. A speed estimator 33 is accordingly employed with the demodulator 32 to generate a signal representing mobile unit speed for use in making reliability based, symbol error decisions that enable improved R-S decoding of the demodulator digital output signals.

Doppler shift is determined to estimate mobile unit speed. The Doppler shift parameter is derived from demodulator data. Specifically, the magnitude difference between the frequency tracked by the demodulator and the known transmitter frequency is the Doppler shift.

In turn, mobile unit speed is computed from the Doppler shift by the following equation:

$$\text{speed} = \lambda \times (\text{Doppler shift})$$

where: $\lambda$ is the carrier wave length, normally about one meter.

As one alternative, a fade rate estimator may be employed to estimate mobile unit speed. The fade rate estimator can be embodied as disclosed in a copending application Ser. No. 07/881,271, entitled "Sequential Power Estimation for Cellular System Handoff", filed May 11, 1992, which is now patented (U.S. Pat. No. 5,367,559) and hereby incorporated by reference. Generally, in the fade rate estimator, mobile unit speed is calculated by the equation:

$$\text{speed} \cong \lambda \times (\text{Fade Rate})$$

The demodulator 32 generates an output digital signal that represents an encoded message word and is applied to an R-S symbol assembler 36 to convert the channel (QPSK) symbols to the R-S symbol format (two bits per symbol). In turn, R-S words are applied to an R-S decoder 38 for error correction and message word output.

The mobile unit speed signal, derived by the speed estimator 33 from demodulator data, is applied along with magnitude and phase error magnitude from the calculator 34 as soft information to a symbol erasure decision subsystem (EDS) 40. In the EDS 40, erasure location decisions are based on the input soft decision information.

Generally, a representation of the reliability of each accepted channel symbol is determined from the soft information for that channel symbol, and a representation of the reliability of each R-S symbol is determined from a combination of the reliability representations for the channel symbols that form the R-S symbol. Signals representing resultant R-S symbol erasure location decisions are applied from the EDS 40 to the R-S decoder 38 where significantly improved decoding is performed.

In the present embodiment, the R-S symbol magnitude is made equal to the sum of the corresponding channel symbol magnitudes. Similarly, the R-S symbol phase error magnitude is determined from the sum of the individual channel phase error magnitudes.

A digital signal processor 46 (DSP) is preferably employed to implement decoding and other functions for the cellular receiver circuitry 29. A dotted line is used in FIG. 2 to designate the functions preferably performed by the DSP hardware.

PROCEDURE FOR DECODING WITH SYMBOL ERASURE DECISION-MAKING BASED ON VEHICLE SPEED

Figure 3:
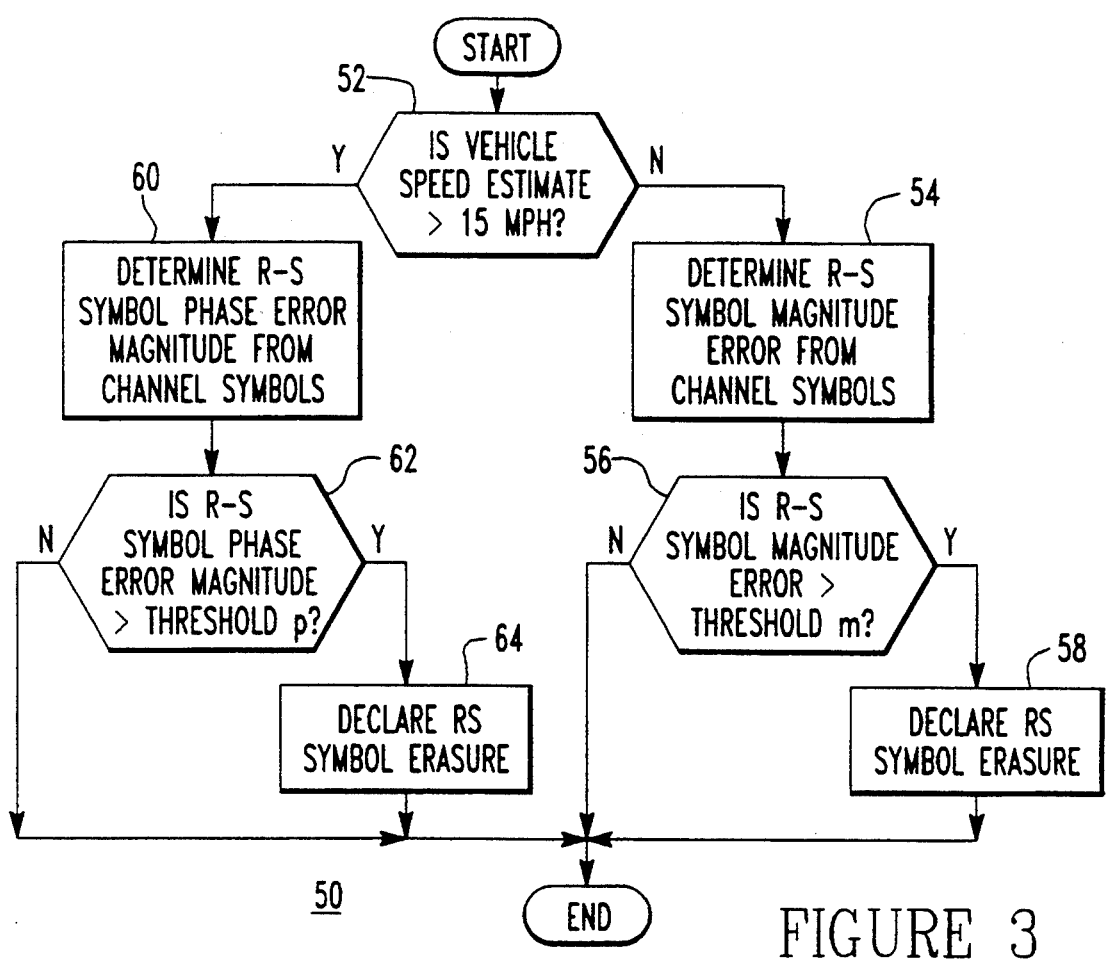
FIG. 3 illustrates a general flow chart for a programmed procedure for the erasure decision subsystem of FIG. 2.

A flow chart in FIG. 3 illustrates procedural logic 50 employed in making symbol erasure assignments. After startup, a test block 52 determines whether the mobile unit or vehicle speed is greater than a threshold value which, in this embodiment, is 15 mph. The threshold speed represents the point at which a switchover is made from using one of the two parameters to the other one in estimating symbol reliability.

If the estimated actual speed is greater than the threshold, a block 54 determines the R-S symbol magnitude error from the channel symbols corresponding to the R-S symbol being processed. A threshold value is assigned to magnitude, and if the calculated magnitude in the block 54 is determined to be less than the threshold value in block 56, the R-S symbol being processed is declared for an erasure in block 58. Otherwise, block 59 ends the pass through the procedure 50.

If the estimated actual speed is less than the threshold, a block 60 determines the R-S symbol phase error magnitude from the channel symbols corresponding to the R-S symbol being processed. As previously, a threshold value is assigned to the phase error magnitude.

Test block 62 determines whether the threshold phase error magnitude value is exceeded. If so, a block 64 declares an erasure for the R-S symbol being processed. Otherwise, the procedure 50 is ended by the block 59.

As one alternative, a fixed number of erasure locations can be employed as opposed to employing a threshold test as described. The fixed erasure list would contain the least reliable symbols.

Figure 4:
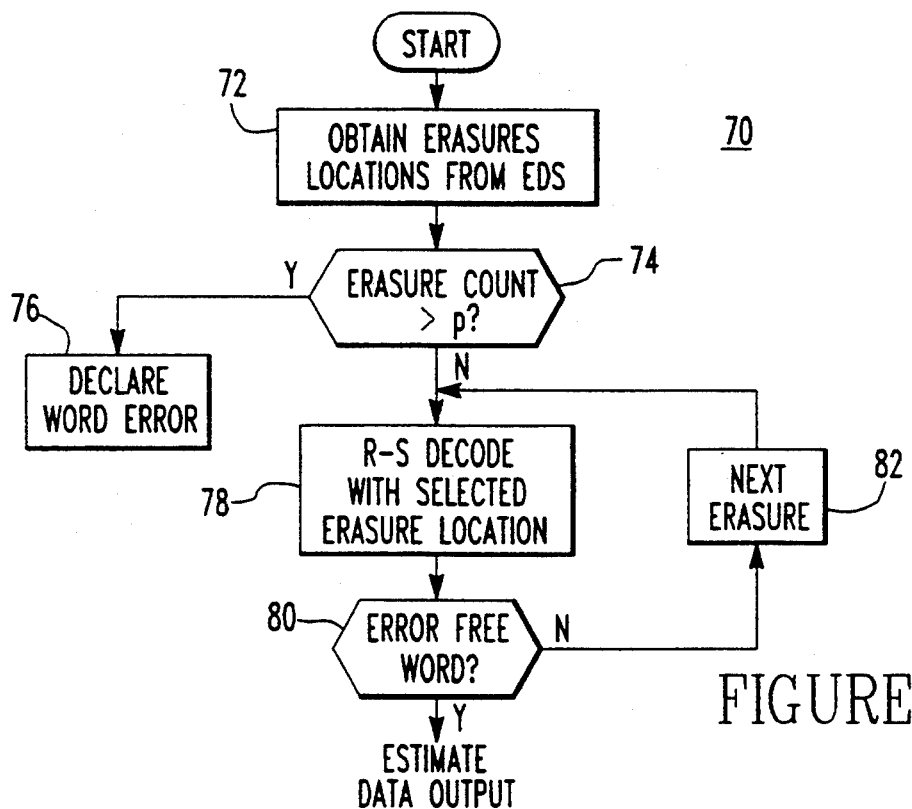
FIG. 4 shows a general flow chart for a programmed procedure for an R-S decoder employed in the receiver circuitry of FIG. 2.

A procedure 70 (FIG. 4) is employed in the R-S decoder 40 to integrate symbol error decision inputs into the decoding process and thereby provide improved R-S decoding. After startup, a block 72 obtains the assigned R-S erasure locations from the EDS 40, and preferably implements the erasures in the order of increasing estimated reliability. A symbol erasure counter 74 next determines whether the number of symbol erasures for the current word exceeds the number p of parity bits. If so, a word error is declared in box 76.

Otherwise, a block 78 performs an R-S decoding operation on the current word with the currently selected erasure location. If the decoded result is error free, an estimated data output is generated. If not, a block 82 calls the next erasure location and the flow steps just described are repeated.

INVENTION PERFORMANCE

For vehicle speeds above 15 mph at an operating frequency of 800 MHz or higher it has been found that symbol erasure decisions are more reliable if magnitude information is given a higher weighting than phase error information. At vehicle speeds below 15 mph it has been found that phase error is a more reliable indicator of symbol erasures. Since the Doppler frequency shift is determinable from the received I/Q information, the erasure decision system can adapt its threshold to provide more reliable erasure decisions.

An erasure decision system was implemented in accordance with the invention along with a time domain Reed-Solomon decoder which could correct erasures as well as errors within a received R-S code word. The R-S decoder was fed erasure decisions and had improved BER over an R-S decoder which was not fed erasure decisions in a mobile fading channel. Various R-S codes over various GF lengths were used to compare the BER performance between the R-S decoder with erasure information and the R-S decoder without erasure information. It was found that the R-S decoder with erasure information performed consistently better than the R-S decoder without erasure information.

The foregoing description of the preferred embodiment has been presented to illustrate the invention. It is not intended to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

What is claimed is:

1. A receiver for a digital cellular communication system in which a mobile unit and a base station unit are linked, the receiver being included in at least one of the mobile and the base station units and comprising:
   means for receiving transmitted signals encoded with a preselected trellis or block code;
   means for demodulating the received signals to generate digital word signals for decoding;
   means for computing phase error magnitude for each channel symbol in the received signals;
   means for computing magnitude error for each channel symbol in the received signals;
   means for estimating mobile unit speed from demodulating data; and
   means for decoding the digital word signals in accordance with the phase error magnitude and the magnitude error as a function of the mobile unit speed.

2. A receiver for a digital cellular communication system in which a mobile unit and a base station unit are linked, the receiver being included in at least one of the mobile and the base station units and comprising:
   means for receiving transmitted signals encoded with the Reed-Solomon (R-S) code;
   means for demodulating the received signals to generate digital word signals for decoding;
   means for computing phase error magnitude for each channel symbol in the received signals;

means for computing magnitude error for each channel symbol in the received signals.;

means for estimating mobile unit speed from demodulating data;

means for selecting R-S symbol erasures in each digital word in accordance with the phase error magnitude and the magnitude error as a function of the mobile unit speed; and means for R-S decoding the digital word signals in accordance with the selected R-S symbol erasures.

3. The digital cellular receiver of claim 2 wherein a threshold speed is preselected and the selecting means selects erasures in accordance with the phase error magnitude when the speed is less than the threshold and in accordance with the magnitude error when the speed is greater than the threshold.

4. The digital cellular receiver of claim 3 wherein the threshold speed is approximately fifteen miles per hour.

5. The digital cellular receiver of claim 3 wherein the phase error magnitude error and the magnitude error are determined for each R-S symbol as respective functions of the corresponding channel symbols.

6. The digital cellular receiver of claim 5 wherein the decoding means generates the phase error magnitude for each R-S symbol as the sum of phase error magnitudes of corresponding channel symbols and further generates the magnitude for each R-S symbol as the sum of magnitudes of corresponding channel symbols.

7. The digital cellular receiver of claim 5 wherein an R-S symbol erasure is declared when the R-S symbol phase error magnitude is greater than a predetermined phase error threshold or when the R-S symbol magnitude is less than a predetermined magnitude threshold.

8. The digital cellular receiver of claim 2 wherein the receiver is embodied in a base station and a digital signal processor embodies the demodulating, computing, estimating and decoding means.

9. A method for operating a digital cellular receiver in a cellular communication system in which a mobile unit and a base station unit are linked, the receiver being included in at least one of the mobile and base station units, the steps of the method comprising:

receiving transmitted signals encoded with the Reed-Solomon (R-S) code;

demodulating the received signals to generate digital word signals for decoding;

computing phase error magnitude for each channel symbol in the received signals;

computing magnitude error for each channel symbol in the received signals;

estimating mobile unit speed from demodulating data;

selecting R-S symbol erasures in each digital word in accordance with the phase error magnitude and the magnitude error as a function of the mobile unit speed; and R-S decoding the digital word signals in accordance with the selected R-S symbol erasures.

10. The operating method of claim 9 wherein a threshold speed is preselected and erasures are selected in the selecting step in accordance with the phase error magnitude when the speed is less than the threshold and in accordance with the magnitude error when the speed is greater than the threshold.

11. A receiver for a digital cellular communication system in which a mobile unit and a base station unit are linked, the receiver being included in at least one of the mobile and the base station units and comprising:

a circuit for receiving transmitted signals encoded with a preselected trellis or block code;

a demodulator for demodulating the received signals to generate digital word signals for decoding;

a system for computing phase error magnitude for each channel symbol, for computing magnitude error for each channel symbol, and for estimating mobile unit speed from demodulating data; and a decoder for decoding the digital word signals in accordance with the phase error magnitude and the magnitude error as a function of the mobile unit speed.

12. A receiver for a digital cellular communication system in which a mobile unit and a base station unit are linked, the receiver being included in at least one of the mobile and the base station units and comprising:

a circuit for receiving transmitted signals encoded with the Reed-Solomon (R-S) code;

a demodulator for demodulating the received signals to generate digital word signals for decoding;

a system for computing phase error magnitude for each channel symbol in the received signals, for computing magnitude error for each channel symbol in the received signals, and for estimating mobile unit speed from demodulating data;

a selector system for selecting R-S symbol erasures in each digital word in accordance with the phase error magnitude and the magnitude error as a function of the mobile unit speed; and a decoder for R-S decoding the digital word signals in accordance with the selected R-S symbol erasures.

13. The digital cellular receiver of claim 12 wherein a threshold speed is preselected and the selector system selects erasures in accordance with the phase error magnitude when the speed is less than the threshold and in accordance with the magnitude error when the speed is greater than the threshold.

14. The digital cellular receiver of claim 13 wherein the threshold speed is approximately fifteen miles per hour.

15. The digital cellular receiver of claim 13 wherein the phase error magnitude error and the magnitude error are determined for each R-S symbol as respective functions of the corresponding channel symbols.

16. The digital cellular receiver of claim 15 wherein the decoder generates the phase error magnitude for each R-S symbol as the sum of phase error magnitudes of corresponding channel symbols and further generates the magnitude for each R-S symbol as the sum of magnitudes of corresponding channel symbols.

17. The digital cellular receiver of claim 15 wherein an R-S symbol erasure is declared when the R-S symbol phase error magnitude is greater than a predetermined phase error threshold or when the R-S symbol magnitude is less than a predetermined magnitude threshold.

18. The digital cellular receiver of claim 12 wherein the receiver is embodied in a base station and a digital signal processor embodies the demodulator, the computing system and the decoder.

* * * * *